United States Patent [19]

Jordan

[11] 4,293,995

[45] Oct. 13, 1981

[54] METHOD OF MAKING CAMSHAFT FOR RECIPROCABLE PISTON ENGINES

[75] Inventor: Friedrich Jordan, Kürten, Fed. Rep. of Germany

[73] Assignee: Klöckner-Humboldt-Deutz Aktiengesellschaft, Cologne, Fed. Rep. of Germany

[21] Appl. No.: 82,017

[22] Filed: Oct. 5, 1979

Related U.S. Application Data

[63] Continuation of Ser. No. 898,818, Apr. 21, 1978, abandoned, which is a continuation of Ser. No. 733,071, Oct. 18, 1975, abandoned.

[30] Foreign Application Priority Data

Oct. 18, 1975 [DE] Fed. Rep. of Germany ....... 2546802

[51] Int. Cl.³ .............................................. B23P 17/00
[52] U.S. Cl. .................................... 29/421 R; 29/523; 72/58; 74/567
[58] Field of Search .................. 29/421 R, 523, 6; 74/567, 568 R; 72/58

[56] References Cited

U.S. PATENT DOCUMENTS

| | | | |
|---|---|---|---|
| 616,764 | 12/1898 | Bourke | 72/58 |
| 1,390,949 | 9/1921 | Yassenoff | 74/567 |
| 1,527,456 | 2/1925 | Woydt et al. | 74/568 |
| 2,107,747 | 2/1938 | Campbell | 74/567 |
| 2,892,254 | 6/1959 | Garvin | 29/421 R |
| 2,952,899 | 9/1960 | Glavan | 29/421 R X |
| 3,206,845 | 9/1965 | Crump | 29/421 R X |
| 3,462,821 | 8/1969 | Cours et al. | 29/421 R X |
| 3,869,938 | 3/1975 | Schlotterbeck et al. | 74/567 |
| 3,911,549 | 10/1975 | Herr | 29/421 R |

FOREIGN PATENT DOCUMENTS

| | | | |
|---|---|---|---|
| 275842 | 8/1927 | United Kingdom | 74/567 |
| 489326 | 7/1938 | United Kingdom | 74/567 |

*Primary Examiner*—Charlie T. Moon
*Attorney, Agent, or Firm*—Becker & Becker, Inc.

[57] ABSTRACT

A camshaft with cams and bearings for reciprocable piston engines, which comprises a hollow shaft having the cams and bearings designed as cam rings and bearing rings and fastened to the hollow shaft.

2 Claims, 3 Drawing Figures

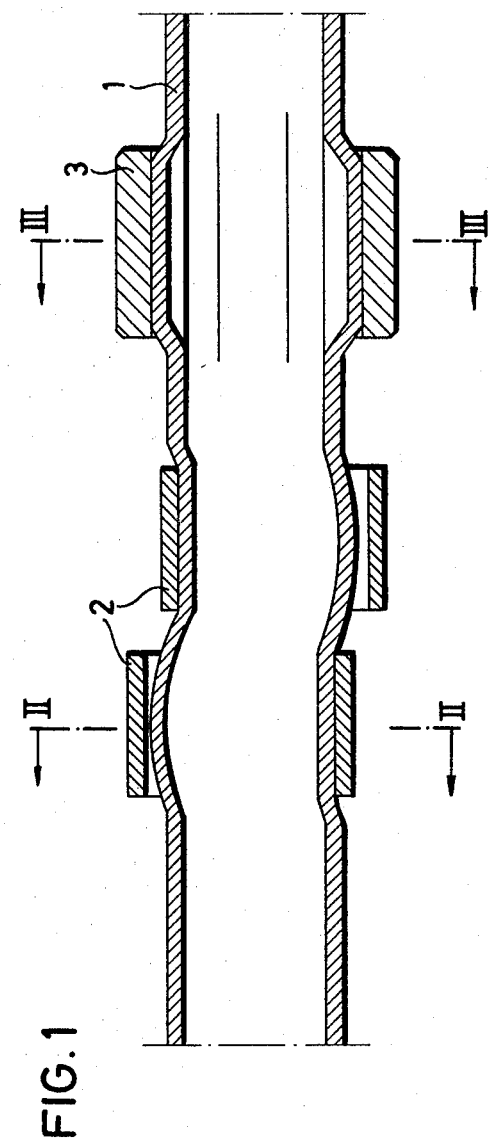
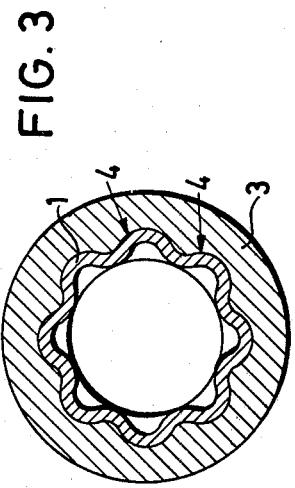
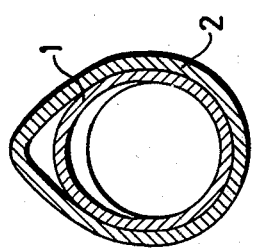
FIG. 1
FIG. 2
FIG. 3

METHOD OF MAKING CAMSHAFT FOR RECIPROCABLE PISTON ENGINES

This is a continuation of application Ser. No. 898,818, filed Apr. 21, 1978 now abandoned, which was a continuation of application Ser. No. 733,071, filed Oct. 18, 1975, also abandoned.

The present invention relates to a camshaft for reciprocable piston engines, in which bearings, cams, gears and the like are produced as individual parts and are fastened to the shaft. With such a camshaft disclosed for instance in German Offenlegungsschrift No. 336241, the cams and bearings are produced from the full and are fastened to the shaft. To this end, the shaft, and correspondingly also the cams and bearings have a hexagonal profile which absorbs the forces. With this camshaft it has been found disadvantageous that the same amount of material is necessary as with a cast or forged camshaft because the shaft as well as the cams are produced from the full. The camshaft is therefore as heavy, and in addition, even more expensive than the customary cast or forged camshaft.

It is, therefore, an object of the present invention to provide a camshaft which will be lighter in weight and considerably cheaper to manufacture, and will have the necessary strength.

These and other objects and advantages of the invention will appear more clearly from the following specification in connection with the accompanying drawing, in which:

FIG. 1 is a longitudinal section through a camshaft according to the present invention.

FIG. 2 represents a cross section through the cam ring and hollow shaft of a camshaft according to the invention, said section being taken along the line II—II of FIG. 1.

FIG. 3 represents a cross section through the bearing ring and the hollow shaft according to the section line III—III of FIG. 1.

The camshaft according to the present invention is characterized primarily in that the shaft is designed as a hollow shaft and that the cams and bearings are designed as cam rings and bearing rings and are fastened to said hollow shaft.

In this way, it will be possible for the cams and the bearing rings as well as for the shaft to select the required material in order to assure good strength and high hardness and wear resistance. In view of the design of the cams and bearings as cam rings and bearing rings, they are produced from solid material but are annular and relatively thin walled which results in a considerable saving in weight.

According to a further development of the invention, it is suggested that the cam rings and bearing rings are made of correspondingly shaped tubular sections with substantially the same wall thickenss over their entire circumference, preferably of drawn profile pipes. Such profile pipes may be purchased at any desired wall thickness and of any desired shape and furthermore of various qualities. Therefore, it is merely necessary to connect these rings to the hollow shaft. The tip and a considerable portion of the flanks of the cam rings are designed in a cantilever manner and are not supported by the shaft. This is sufficient for their strength and brings about the great advantage of saving weight. This is of particular importance with a camshaft inasmuch as the said weight accumulations are arranged eccentrically with regard to the central axis of the cam shaft and therefore cause unbalances. The bearing rings and/or other parts arranged on the shaft as for instance gears, have their inner wall provided with axially extending grooves or the like by means of which these parts can be fastened to the shaft. Such fastening may for the cams as well as for the bearing rings advantageously be effected by widening the hollow shaft while the hollow shaft is deformed to such an extent that their outer wall extends into the grooves of the bearing rings and gears and into the inner shape of the cam rings which corresponds to the cams. As a result thereof, it will be possible in a simple manner to support the cam rings and bearing rings to and on the shaft. To this end, the cam rings and bearing rings are inserted into a die which corresponds to their outer shape in order to be sure that the widening of the hollow shaft will not cause a deformation thereof. The widening of the hollow shaft is effected advantageously by means of a rubber rod which substantially corresponds to the inner diameter of said hollow shaft and which is compressed from the oppositely located end faces. Also other desired methods, for instance hydraulic or electro-hydraulic widening may be practiced.

Referring now to the drawing in detail, as will be seen, the hollow shaft 1 has connected thereto cam rings 2 and bearing rings 3 (one only being shown). The cam rings 2 and bearing rings 3 are made of correspondingly shaped pipe sections with substantiallly equal wall thickness. This is done in a particularly favorable manner by preparing pipe sections of the required strength from drawn profile pipes. These pipe sections can be employed without further machining the same, for producing the camshaft. The bearing rings, in addition to the cam rings 2 have their inner wall provided with axially extending grooves 4.

The manufacture of the cam shaft is effected by slipping cam rings 2 and bearing rings 3 at the desired areas onto the hollow shaft and clamping said rings in their respective position in a corresponding die. Thereupon, a rubber rod corresponding to about the inner diameter of the hollow shaft is inserted at the predetermined spot into the hollow shaft, said rubber rod being compressed from oppositely located end faces. As a result thereof, the pipe section widens while the deformation of the hollow shaft is to be effected to such an extent that the outside wall of said hollow shaft reaches into the grooves of the bearing rings and into the inner form of the cam rings (FIG. 2) which inner form corresponds to the cam. In this way, a good support of the cam rings and bearing rings on the hollow shaft will be assured. In a manner similar to the bearing rings, also the gears can be connected to the hollow shaft while with these gears it may possibly be advantageous to provide one or more transverse grooves on the inner wall so that an axial securing of the gears on the hollow shaft will be assured.

The widening of the hollow shaft by means of a rubber rod has the advantage that no special sealing of the pressing medium is required because the rubber rod has a compact mass. It may also be mentioned that a widening by hydraulic or electro-hydraulic means or other means is, of course, possible.

It is merely important that the widening is so effected that the cam rings and bearings rings will be well connected to the hollow shaft. Subsequently, the camshaft is ground or honed in a customary manner.

It is, of course, to be understood that the present invention is, by no means, limited to the specific showing in the drawings, but also comprises any modifications within the scope of the appended claims.

What I claim is:

1. A method of making a camshaft having cam and bearing ring members on a hollow shaft with the cam ring members laterally offset relative to the axis of the shaft, which includes placing cam and bearing ring members on the tubular shaft, mounting said members on said tubular shaft in dies to preserve their shape, each of said ring members having in the inner wall thereof at least one recess means extending substantially the length of the member, and expanding said tubular member into said ring members and into said recess means to secure said ring members to said shaft with the cam ring members laterally offset relative to the axis of the shaft.

2. A method as claimed in claim 1, in which a rubber rod is introduced into said tubular shaft and compressive force is applied to said rubber rod from opposite ends to expand said tubular shaft.

* * * * *